(12) United States Patent
Wang

(10) Patent No.: US 11,375,150 B1
(45) Date of Patent: Jun. 28, 2022

(54) IMAGE SENSOR WITH THREE READOUT APPROACH FOR PHASE DETECTION AUTO FOCUS AND IMAGE SENSING PHOTODIODES

(71) Applicant: OMNIVISION TECHNOLOGIES, INC., Santa Clara, CA (US)

(72) Inventor: Rui Wang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/342,378

(22) Filed: Jun. 8, 2021

(51) Int. Cl.
  *H04N 5/369* (2011.01)
  *H04N 5/378* (2011.01)
  *H04N 5/374* (2011.01)
(52) U.S. Cl.
  CPC ......... *H04N 5/378* (2013.01); *H04N 5/36961* (2018.08); *H04N 5/374* (2013.01)
(58) Field of Classification Search
  None
  See application file for complete search history.

(56) References Cited

U.S. PATENT DOCUMENTS

| 2020/0161352 A1 | 5/2020 | Takahashi et al. |
| 2020/0162673 A1* | 5/2020 | Kanda .................. H04N 5/2253 |

* cited by examiner

*Primary Examiner* — Mark T Monk
(74) *Attorney, Agent, or Firm* — Perkins Coie LLP

(57) ABSTRACT

An imaging device includes a photodiode array including a 2×2 grouping of N×N groupings of photodiodes. Each N×N grouping includes $N^2-1$ image sensing photodiodes and a single phase detection autofocus (PDAF) photodiode that is arranged proximate to a center of the 2×2 grouping. A shared floating diffusion is coupled to each photodiode of a respective N×N grouping of photodiodes. An analog to digital converter (ADC) is configured to generate a reference readout in response to charge in the shared floating diffusion after a reset operation. The ADC is next configured to generate a PDAF readout in response to charge transferred from the single PDAF photodiode to the shared floating diffusion. The ADC is then configured to generate a combined readout in response to charge transferred from the image sensing photodiodes combined with the charge transferred previously from the single PDAF photodiode in the shared floating diffusion.

30 Claims, 4 Drawing Sheets

IMAGE SENSOR WITH THREE READOUT APPROACH FOR PHASE DETECTION AUTO FOCUS AND IMAGE SENSING PHOTODIODES

BACKGROUND INFORMATION

Field of the Disclosure

This disclosure relates generally to image sensors, and in particular but not exclusively, relates to image sensors that include phase detection auto focus pixels.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which are read out as analog signals from the column bitlines and converted to digital values to produce digital images (i.e., image data) that represent the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
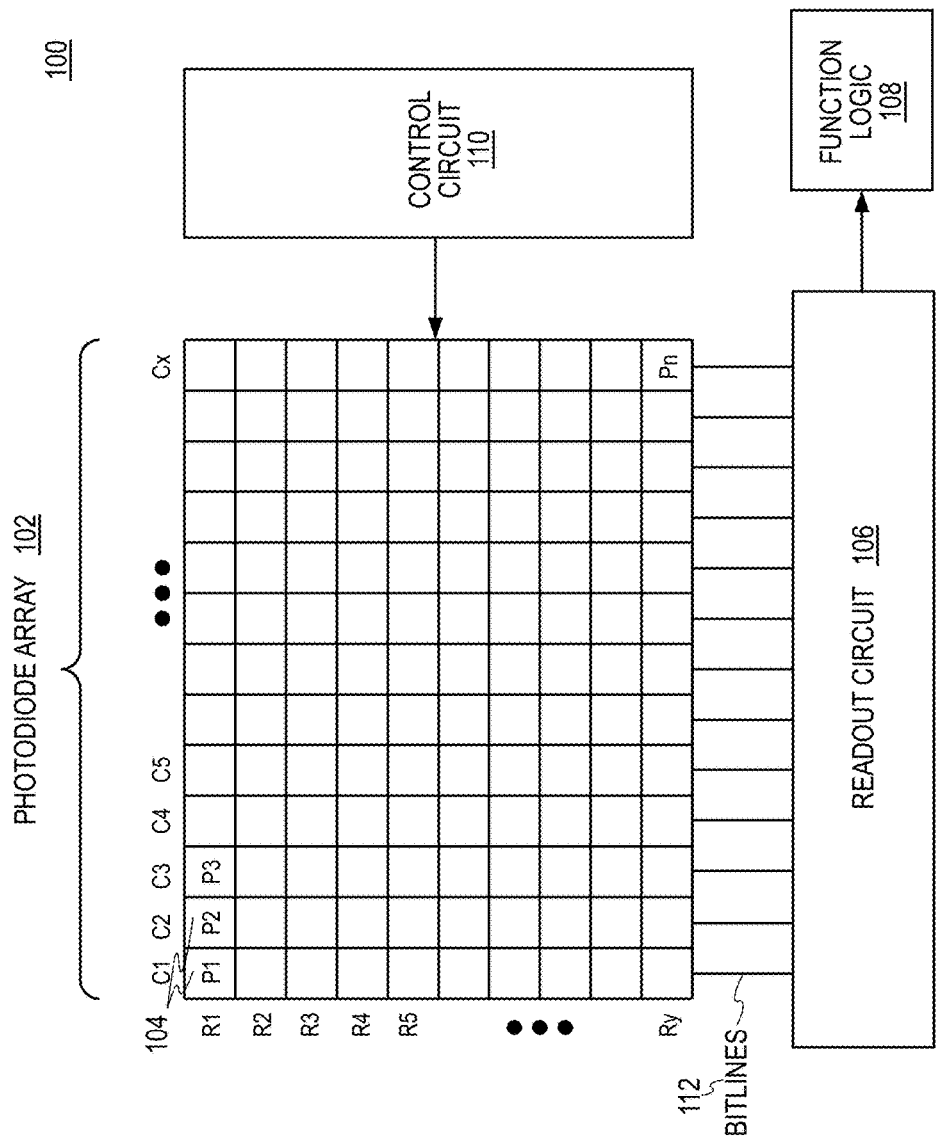
FIG. 1 illustrates one example of an imaging system including a photodiode array with phase detection auto focus and image sensing photodiodes in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging system including a photodiode array with phase detection auto focus and image sensing photodiodes are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system including a photodiode array with phase detection auto focus photodiodes interspersed among image sensing photodiodes are described. In various examples, the imaging system includes an imaging device with a plurality of photodiodes arranged in the photodiode array to generate charge in response to incident light. The photodiode array includes a 2×2 grouping of N×N groupings of photodiodes, where N is greater than 1. In one example, N=3. Each N×N grouping of photodiodes includes $N^2-1$ image sensing photodiodes and a single phase detection autofocus (PDAF) photodiode that is arranged proximate to a center region of the 2×2 grouping of N×N groupings of photodiodes. A shared floating diffusion is configured to receive charge transferred from each photodiode of a respective N×N grouping of photodiodes. An analog to digital converter (ADC) is configured to perform a first ADC conversion to generate a reference readout in response to charge in the shared floating diffusion after a reset operation. The ADC is next configured to perform a second ADC conversion to generate a PDAF readout in response to charge transferred from the single PDAF photodiode to the shared floating diffusion. The ADC is then configured to perform a third ADC conversion to generate a combined readout in response to charge transferred from the $N^2-1$ image sensing photodiodes combined with the charge transferred previously from the single PDAF photodiode in the shared floating diffusion. In one example, an image readout may be determined from the combined readout.

In the various examples, the imaging device also includes a plurality of transfer transistors. Each one of the plurality of transfer transistors is coupled between a corresponding one of the plurality photodiodes and a respective shared floating diffusion of each N×N grouping. The plurality of transfer transistors includes a PDAF transfer transistor coupled between the single PDAF photodiode of each N×N grouping and the respective shared floating diffusion of each N×N grouping. The plurality of transfer transistors also includes $N^2-1$ image sensing transfer transistors coupled between the $N^2-1$ image sensing photodiodes of each N×N grouping and the respective shared floating diffusion of each N×N grouping.

A reset transistor is coupled between the respective shared floating diffusion of each N×N grouping and a voltage supply. A gate of a source follower transistor is coupled to the respective shared floating diffusion of each N×N grouping and a source of the source follower transistor is coupled to a column bitline. In one example, the source of the source follower transistor is coupled to the column bitline through a row select transistor.

In the examples, the ADC is configured to perform the first ADC conversion in response to the reset transistor being pulsed while the plurality of transfer transistors are turned off to reset the respective shared floating diffusion of each N×N grouping. The ADC is configured to perform the second ADC conversion in response to the PDAF transfer transistor being pulsed while the reset transistor and the $N^2-1$ image sensing transfer transistors are turned off. The ADC is configured to perform the third ADC conversion in response to the $N^2-1$ image sensing transfer transistors being pulsed while the reset transistor and the PDAF transfer transistor are turned off.

To illustrate, FIG. 1 illustrates one example of an imaging system 100 including an imaging device with an array of photodiodes including phase detection autofocus photodiodes interspersed among image sensing photodiodes in accordance with an embodiment of the present disclosure. In particular, imaging system 100 includes a photodiode array 102, a control circuit 110, a readout circuit 106, and function logic 108. In one example, photodiode array 102 is a two-dimensional (2D) array of photodiodes 104, (e.g., P1, P2, . . . , Pn), which include phase detection autofocus photodiodes interspersed among image sensing photodiodes. In various examples, it is appreciated that the transfer transistors coupled to the phase detection autofocus photodiodes may be controlled separately or independently from the image sensing photodiodes in the photodiode array 102. As illustrated in the depicted example, photodiodes 104 are arranged into rows (e.g., R1 to Ry) and columns (e.g., C1 to Cx) to acquire image data or focus data of a person, place, object, etc., which can then be used to acquire and render a 2D image of the person, place, object, etc. In the examples, the phase detection autofocus photodiodes interspersed in the photodiode array 102 provide phase detection information, which can be used for autofocus operations of imaging system 100.

In one example, each photodiode 104 in photodiode array 102 is configured to photogenerate image charge or phase detection autofocus charge in response to incident light. The image charge or phase detection autofocus charge generated in each photodiode 104 is transferred to a shared floating diffusion in each pixel circuit, which is converted to an image signal or a phase detection autofocus signal, which is then read out from each pixel circuit by readout circuit 106 through column bitlines 112. In various examples, the signals read out from photodiode array 102 may be amplified, digitized, and then transferred to function logic 108. In various examples, the readout circuit 106 includes amplification circuitry, analog to digital converters (ADC), or otherwise. In one example, the readout circuit 106 may read out a row of data at a time along column bitlines 112 as illustrated in FIG. 1, or may read out the data using a variety of other techniques (not illustrated), such as a serial readout or a full parallel readout of all pixel circuits simultaneously. The function logic 108 may store the image data or even manipulate the image data by applying post image effects (e.g., crop, rotate, remove red eye, adjust brightness, adjust contrast, or otherwise).

Figure 2:
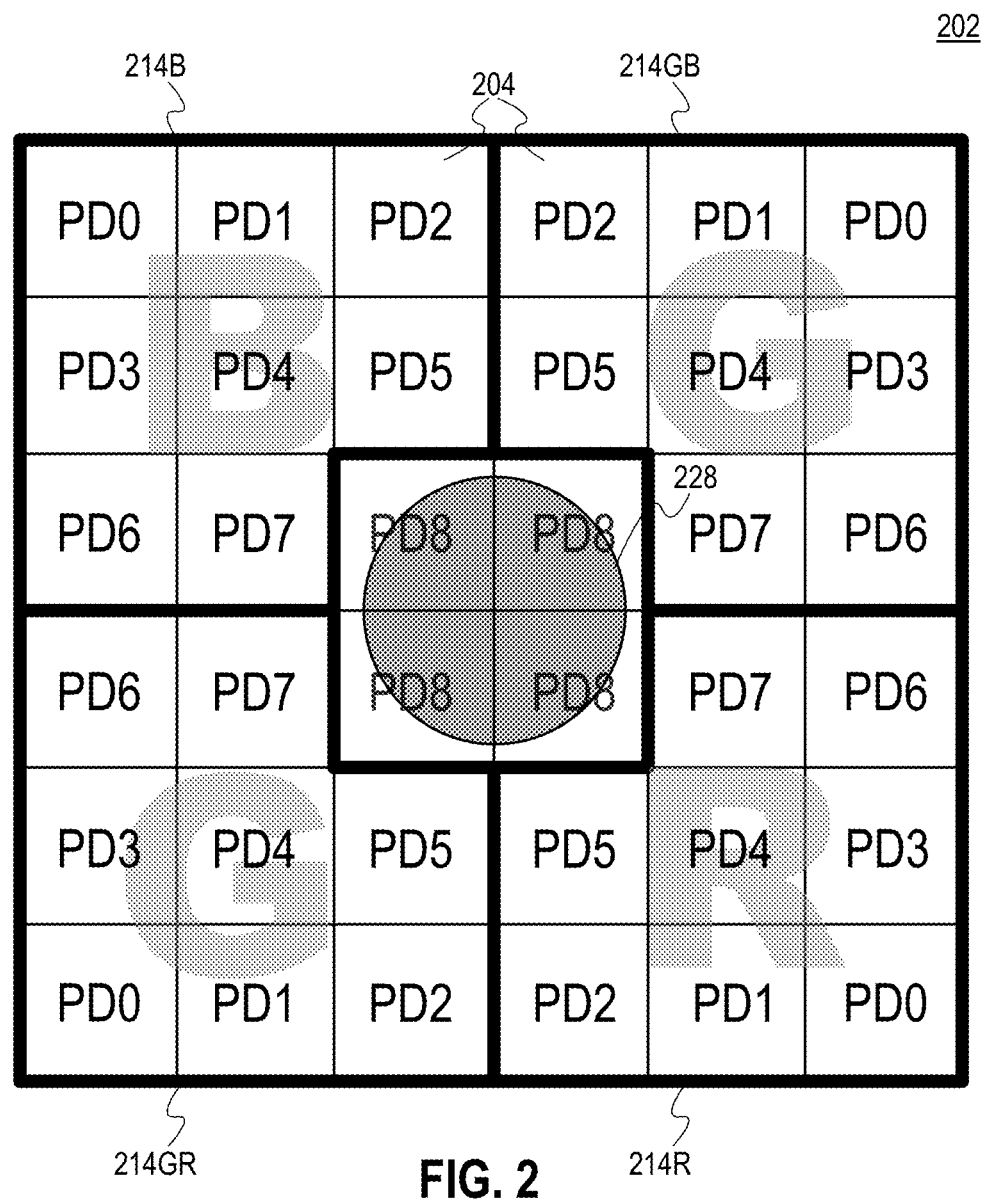
FIG. 2 illustrates a one example of a photodiode array including phase detection autofocus photodiodes interspersed among image sensing photodiodes in accordance with the teachings of the present disclosure.

FIG. 2 illustrates one example of a photodiode array 202 of photodiodes 204, which include phase detection autofocus (PDAF) photodiodes interspersed among image sensing photodiodes in accordance with the teachings of the present disclosure. In particular, the example depicted in FIG. 2 illustrates the photodiode array 202, which includes a plurality of photodiodes 204 arranged in rows and columns in the photodiode array to generate charge in response to incident light.

In the various examples, the plurality of photodiodes 204 includes a first set of photodiodes that are configured as image sensing photodiodes and a second set of photodiodes that are configured as PDAF photodiodes. In the examples, the PDAF photodiodes are arranged in at least neighboring pairs in the photodiode array 202, which are interspersed among the image sensing photodiodes throughout the photodiode array 202. As will be described in greater detail, each neighboring pair of PDAF photodiodes includes a first PDAF photodiode and a second PDAF photodiode.

The example depicted in FIG. 2 illustrates that photodiode array 202 is implemented in a color pixel array arranged into 2×2 groupings of N×N groupings of photodiodes 204, where N is greater than 1. In particular, the example illustrated in FIG. 2 shows an example with N=3. Thus, the particular example shown in FIG. 2 shows that photodiode array 202 includes a 2×2 grouping of 3×3 groupings of photodiodes 204. In the example, the 3×3 groupings are labeled 214B, 214GB, 214GR, and 214R. Each 3×3 grouping of photodiodes illustrated in FIG. 2 includes 9 photodiodes, which are labeled PD0, PD1, PD2, PD3, PD4, PD5, PD6, PD7, and PD8. In the example, each N×N grouping (e.g., N=3) includes a single PDAF photodiode, which is labeled PD8 for each of the 3×3 groupings shown in FIG. 2. Each N×N grouping also includes $N^2-1$ (e.g., N=3) image sensing photodiodes, which are labeled PD0, PD1, PD2, PD3, PD4, PD5, PD6, and PD7 in FIG. 2.

In the examples, the single PDAF photodiode (e.g., PD8) of each N×N grouping is arranged proximate to a center region of the 2×2 grouping of N×N groupings. Thus, the example depicted in FIG. 2 shows four PD8 PDAF photodiodes that are all located in the center region of 2×2 grouping of 3×3 groupings shown in photodiode array 202. In the example, the four PD8 PDAF photodiodes are arranged in a 2×2 grouping with all four PD8 PDAF photodiodes disposed under a PDAF microlens 228 as shown.

It is appreciated that the example photodiode array 202 illustrated in FIG. 2 may be a portion of a photodiode array in which the pattern shown in FIG. 2 is repeated over multiple groupings of rows and columns. As such, it is appreciated therefore the 2×2 arrangement of the four PD8 PDAF photodiodes that are located in the center region of photodiode array 202 are interspersed among the image sensing photodiodes (e.g., PD0, PD1, PD2, PD3, PD4, PD5, PD6, and PD7) throughout the photodiode array 202 as shown.

In the example depicted in FIG. 2, it is also appreciated that the photodiodes 204 of the photodiode array 202 are binned. As such, information that is generated from each photodiode 204 is summed or combined with information generated from one or more nearby binned photodiodes 204 to generate combined information, and therefore sum the performance of each individual photodiode 204 to improve the performance of the photodiode array 202. For instance, in the example depicted in FIG. 2, the photodiodes 204 of the 3×3 groupings 214B, 214GB, 214GR, 214R are configured to be binned such that the 8 image sensing photodiodes (e.g., PD0, PD1, PD2, PD3, PD4, PD5, PD6, and PD7) included in each 3×3 grouping all share the same color. For instance, in the example depicted in FIG. 2, the 8 image sensing photodiodes (e.g., PD0, PD1, PD2, PD3, PD4, PD5, PD6, and PD7) in 3×3 grouping labeled 214B are all disposed under a blue (B) color filter. The 8 image sensing photodiodes (e.g., PD0, PD1, PD2, PD3, PD4, PD5, PD6, and PD7) in 3×3 groupings labeled 214GB and 214GR are all disposed under a green (G) color filters. The 8 image sensing photodiodes (e.g., PD0, PD1, PD2, PD3, PD4, PD5, PD6, and PD7) in the 3×3 grouping labeled 214R are all disposed under a red (R) color filter.

In the example, Bayer binning is provided for the 8 image sensing photodiodes (e.g., PD0, PD1, PD2, PD3, PD4, PD5, PD6, and PD7) with red (R) color filters, green (G) color filters, and blue (B) color filters, which are disposed over image sensing photodiodes as shown. Although FIG. 2 illustrates the PDAF microlens 228 over the underlying four PD8 PDAF photodiodes for explanation purposes, it is appreciated that the normal image sensing photodiodes (e.g., PD0, PD1, PD2, PD3, PD4, PD5, PD6, and PD7) that are under the color filters (e.g., R, G, B) are also under respective microlenses, which are not shown in FIG. 2 so as not to obscure the teachings of the present invention. In one example, the microlenses for the normal image sensing photodiodes (e.g., PD0, PD1, PD2, PD3, PD4, PD5, PD6, and PD7) may only cover a 1×1 pixel or photodiode area.

In operation, phase detection information is retrieved from the imaging device by comparing or evaluating the PDAF signals from PDAF photodiodes (e.g., under each PDAF microlens 228) with PDAF signals from neighboring PDAF photodiodes. For instance, in one example, the PDAF signals from horizontally adjacent pairs are compared. In other words, the left side pair (e.g., left half) of PDAF photodiodes are compared with the PDAF signals from the right side pair (e.g., right half) of PDAF photodiodes of 2×2 groupings of the four PD8 PDAF photodiodes in the center region. In another example, the PDAF signals from vertically adjacent pairs are compared. In other words, the top side pair (e.g., top half) of PDAF photodiodes are compared with the PDAF signals from the bottom side pair (e.g., bottom half) of photodiodes of the 2×2 groupings of the four PD8 PDAF photodiodes in the center region.

As will be described in greater detail below, in one example during operation, the pixel circuits of photodiodes are all reset and then signals from the pixel circuits are read out and digitized during a first ADC conversion to determine a reference readout value. Next, the PDAF signal from the single PDAF photodiodes of each N×N grouping is read out and digitized during a second ADC conversion to determine a PDAF readout. Then, the signals from the image sensing photodiodes of each N×N grouping are then combined with the PDAF signal from the single PDAF photodiodes and read out and digitized during a third ADC conversion to determine a combined readout in accordance with the teachings of the present invention. In one example, an image readout can then be determined in response to the combined readout. It is appreciated that the single reference readout value determined in response to the first ADC conversion may be utilized to determine a correlated double sampling (CDS) readouts of the PDAF readout and the image readout in accordance with the teachings of the present invention.

Thus, it is appreciated that the PDAF readout and the image readout from each N×N grouping are read out from photodiode array 202 without having to reset the pixel circuit a second time between the readout of the PDAF readout and the image readout. In other words, the PDAF data and image data can be obtained with three readouts instead of four readouts in accordance with the teachings of the present invention. It is appreciated that with only three readouts instead of four readouts, noise performance as well as frame rate performance is improved in accordance with the teachings of the present invention.

Figure 3:
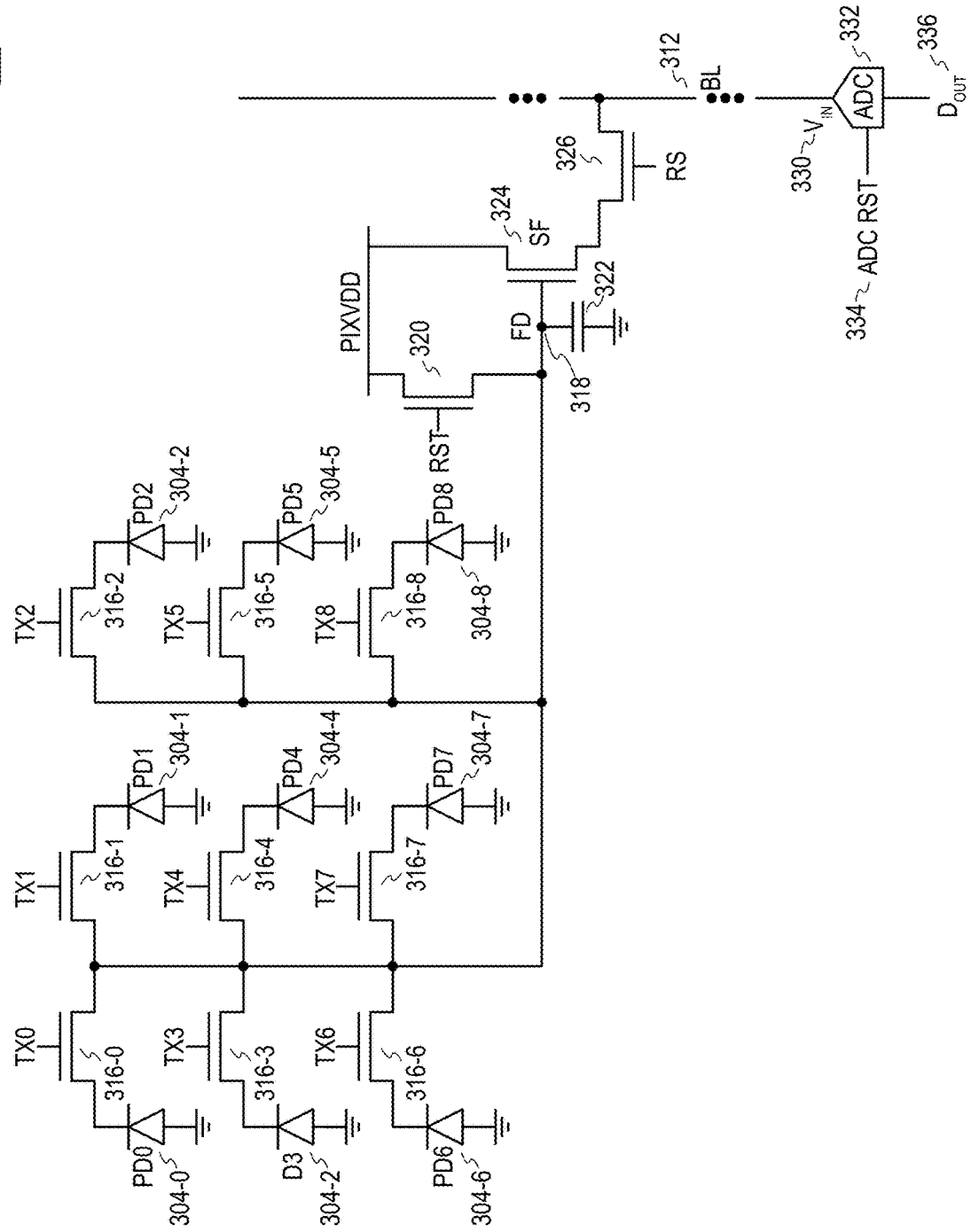
FIG. 3 illustrates one example schematic of a pixel circuit included in an imaging system with a photodiode array including phase detection auto focus photodiodes interspersed among image sensing photodiodes in accordance with the teachings of the present invention.

FIG. 3 illustrates one example schematic of a pixel circuit 314 included in an imaging system with a photodiode array including phase detection auto focus photodiodes interspersed among image sensing photodiodes in accordance with the teachings of the present invention. It is appreciated the pixel circuit 314 of FIG. 3 may be an example of one of the pixel circuits coupled to the 3×3 groupings of photodiodes 214B, 214GB, 214GR, 214R included in photodiode array 202 as shown in FIG. 2, or an example of one of the pixel circuits coupled to the photodiodes 104 included in photodiode array 102 as shown in FIG. 1, and that similarly named and numbered elements described above are coupled and function similarly below.

In the example depicted in FIG. 3, pixel circuit 314 includes nine photodiodes PD0 304-0, PD1 304-1, PD2 304-2, PD3 304-3, PD4 304-4, PD5 304-5, PD6 304-6, PD7 304-7, and PD8 304-8, which are arranged in a 3×3 grouping, as also shown for example in FIG. 2. Therefore, in the depicted example, photodiode PD8 304-8 is configured as a PDAF photodiode and the other eight photodiodes PD0 304-0, PD1 304-1, PD2 304-2, PD3 304-3, PD4 304-4, PD5 304-5, PD6 304-6, and PD7 304-7 are configured as image sensing photodiodes.

As shown in the depicted example, photodiode PD0 304-0 coupled to a transfer transistor 316-0, photodiode PD1 304-1 coupled to a transfer transistor 316-1, photodiode PD2 304-2 coupled to a transfer transistor 316-2, photodiode PD3 304-3 coupled to a transfer transistor 316-3, photodiode PD4 304-04 coupled to a transfer transistor 316-4, photodiode PD5 304-5 coupled to a transfer transistor 316-5, photodiode PD6 304-6 coupled to a transfer transistor 316-6, photodiode PD7 304-7 coupled to a transfer transistor 316-7, and photodiode PD8 304-8 coupled to a transfer transistor 316-8. Thus, each one of the plurality of transfer transistors 316-0 to 316-8 is coupled to a respective one of the plurality of photodiodes PD0 304-0 to PD8 304-8.

In the example, a shared floating diffusion 318 is coupled to transfer transistor 316-0, transfer transistor 316-1, transfer transistor 316-2, transfer transistor 316-3, transfer transistor 316-4, transfer transistor 316-5, transfer transistor 316-6, transfer transistor 316-7, and transfer transistor 316-8. As such, each one of the plurality of transfer transistors 316-0 to 316-8 is coupled between a respective one of the plurality of photodiodes PD0 304-0 to PD8 304-8 and shared floating diffusion 318. In one example, a floating diffusion capacitor 322 is coupled to the shared floating diffusion 318 as shown.

In operation, transfer transistor 316-0 is coupled to be controlled in response to a transfer control signal TX0, transfer transistor 316-1 is coupled to be controlled in response to a transfer control signal TX1, transfer transistor 316-2 is coupled to be controlled in response to a transfer control signal TX2, transfer transistor 316-3 is coupled to be controlled in response to a transfer control signal TX3, transfer transistor 316-4 is coupled to be controlled in response to a transfer control signal TX4, transfer transistor 316-5 is coupled to be controlled in response to a transfer control signal TX5, transfer transistor 316-6 is coupled to be controlled in response to a transfer control signal TX6, transfer transistor 316-7 is coupled to be controlled in response to a transfer control signal TX7, and transfer transistor 316-8 is coupled to be controlled in response to a transfer control signal TX8. As such, charge photogenerated in photodiode 304-0 in response to incident light is transferred to shared floating diffusion 318 in response to transfer control signal TX0, charge photogenerated in photodiode 304-1 in response to incident light is transferred to shared floating diffusion 318 in response to transfer control signal TX1, charge photogenerated in photodiode 304-2 in response to incident light is transferred to shared floating diffusion 318 in response to transfer control signal TX2, charge photogenerated in photodiode 304-3 in response to incident light is transferred to shared floating diffusion 318 in response to transfer control signal TX3, charge photogenerated in photodiode 304-4 in response to incident light is transferred to shared floating diffusion 318 in response to transfer control signal TX4, charge photogenerated in photodiode 304-5 in response to incident light is transferred to shared floating diffusion 318 in response to transfer control signal TX5, charge photogenerated in photodiode 304-6 in response to incident light is transferred to shared floating diffusion 318 in response to transfer control signal TX6, charge photogenerated in photodiode 304-7 in response to incident light is transferred to shared floating diffusion 318 in response to transfer control signal TX7, and charge photogenerated in photodiode 304-8 in response to incident light is transferred to shared floating diffusion 318 in response to transfer control signal TX8.

Assuming that photodiode PD8 304-8 is configured as a PDAF photodiode and that photodiodes PD0 304-0 to PD7 304-7 are configured as image sensing photodiodes, it is appreciated that the transfer transistors 316-0 to 316-7 that are coupled image sensing photodiodes PD0 304-0 to PD7 304-7 are separately controlled from the transfer transistor 316-8 that is coupled to photodiode PD8 304-8. Furthermore, as discussed above with respect to FIG. 2, photodiode PD8 304-8, which is configured as a PDAF photodiode is disposed under a PDAF microlens (e.g., microlenses 228 in FIG. 2) while the photodiodes PD0 304-0 to PD7 304-7, which are configured as image sensing photodiodes are disposed under respective color filters (e.g., R, G, B in FIG. 2) and microlenses.

In the various examples, the incident light that is directed to the photodiodes PD0 304-0 to PD7 304-7 that are configured as image sensing photodiodes is directed through respective microlenses and color filters (e.g, R, G, B of FIG. 2) of a color filter array before reaching the photodiodes PD0 304-0 to PD7 304-7. Thus, the incident light may be directed through a red (R) color filter, or a green (G) color filter, or a blue (B) color filter before reaching the photodiodes PD0 304-0 to PD7 304-7 that are configured as image sensing photodiodes. The incident light that is directed to the photodiode PD8 304-8, which is configured as a PDAF photodiode, is directed through the PDAF microlens (e.g., microlenses 228 of FIG. 2) prior reaching PDF photodiode PD8 304-8. In the various examples, other than the incident light being directed through either a color filter or through a microlens 228, the photodiodes PD0 304-0 to PD8 304-8 are otherwise substantially similar.

Continuing with the example depicted in FIG. 3, a reset transistor 320 is coupled between a voltage supply (e.g., PIXVDD) and the shared floating diffusion 318. In operation, the reset transistor 320 is configured to reset pixel circuit 314 including the charge in shared floating diffusion 318 in response to a reset control signal RST.

As shown in the depicted example, a gate of a source follower transistor 324 is coupled to the shared floating diffusion 318. In the example, the drain of the source follower transistor 324 is coupled to the voltage supply (e.g., PIXVDD), and the source of source follower transistor 324 is coupled to a column bitline 312 through a row select transistor 326. Thus, in other words, the source follower transistor 324 and the row select transistor 326 are coupled between the voltage supply (e.g., PIXVDD) and the column bitline 312. In operation, the row select transistor 326 is configured to output a signal (e.g., image data from image sensing photodiodes PD0 304-0 to PD7 304-7 or PDAF data from the PDAF photodiode PD8 304-8) from the source follower transistor 324 of pixel circuit 314 to column bitline 312 in response to a row select signal RS.

An analog to digital converter (ADC) 332 is coupled to the column bitline 312 to perform ADC conversions of the analog signals received from pixel circuit 314 through column bitline 312. In the depicted example, the analog input of ADC 332 is shown as input voltage $V_{IN}$ 330 and the digital output of ADC 332 is shown as a digital output signal DOUT 336. In one example, the ADC 332 is coupled to be reset in response to an ADC reset signal 334.

Figure 4:
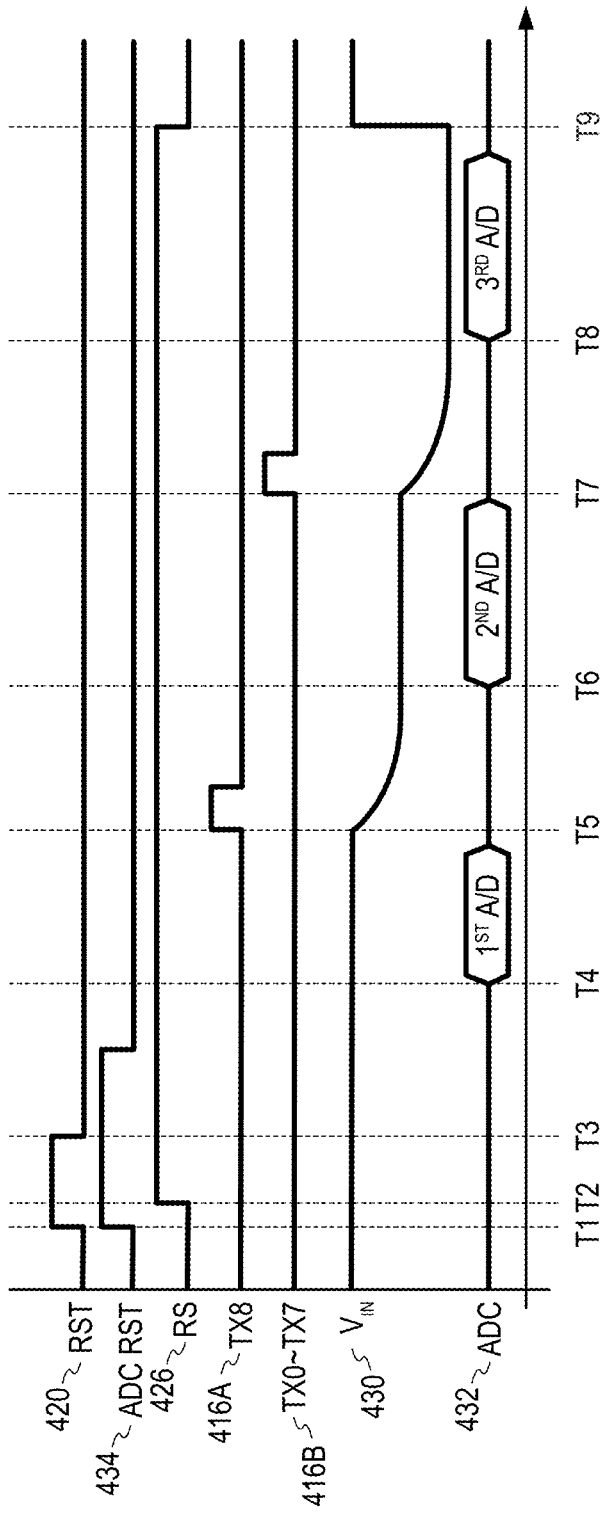
FIG. 4 illustrates one example timing diagram illustrating various signals in a pixel circuit included in an imaging system including a photodiode array with phase detection auto focus photodiodes interspersed among image sensing photodiodes from which phase detection autofocus signals and image signals are generated and read out by an analog to digital converter accordance with the teachings of the present invention.

FIG. 4 illustrates one example timing diagram 428 illustrating various signals in a pixel circuit included in an imaging system including a photodiode array with phase detection auto focus photodiodes interspersed among image sensing photodiodes from which phase detection autofocus signals and image signals are generated and read out by an analog to digital converter accordance with the teachings of the present invention. It is appreciated that the waveforms illustrated in FIG. 4 may be examples of waveforms found in pixel circuit 314 of FIG. 3, and/or one of the pixel circuits coupled to the 3×3 groupings of photodiodes 214B, 214GB, 214GR, 214R included in photodiode array 202 as shown in FIG. 2, and/or imaging system 100 of FIG. 1, and that similarly named and numbered elements referenced below are coupled and function similar to as described above.

In the example depicted in FIG. 4, it is assumed that the photodiodes PD0 304-0 to PD7 304-7 of FIG. 3 are configured as image sensing photodiodes, that photodiode PD8 304-8 of FIG. 3 is configured as a PDAF photodiode, and that a PDAF signal as well as image signals are being read out from the pixel circuit 314 in timing diagram 428 of FIG. 4. As shown in FIG. 4, timing diagram 428 illustrates a reset transistor control signal 420, an ADC reset signal 434, a row select transistor control signal 426, transfer transistor control signal TX8 416A, transfer transistor control signals TX0-TX7 416B, input voltage signal $V_{IN}$ 430, and analog to digital converter (ADC) conversion operations 432.

At time T1, the reset transistor control signal 420 and the ADC reset signal 434 are asserted or pulsed while the transfer transistor control signals TX8 416A and TX0-TX7 416B remain turned off. As such, the reset transistor 320 is turned on while the transfer transistors 316-0 to 316-8 are turned off to reset the pixel circuit 314 including shared floating diffusion 318 as well as the ADC 332 at time T1.

As the shared floating diffusion 318 and the ADC 332 are being reset with the reset transistor 320 being turned on, the row select transistor control signal 426 is then asserted at time T2, which turns on the row select transistor 326.

At time T3 after the shared floating diffusion 318 has been reset, the reset transistor control signal 420 is de-asserted or the pulse in reset transistor control signal 420 ends, which turns off the reset transistor 320 at time T3. After time T3, the ADC reset operation is complete and the ADC reset signal 434 is de-asserted or the pulse in ADC reset signal 434 ends as shown.

After the shared floating diffusion 318 and ADC 332 have been reset, an ADC conversion operation 432 is performed by ADC 332 at time T4 to output a first ADC conversion of the input voltage $V_{IN}$ 430, which is representative of a reference readout or a reset level readout of the pixel circuit 314 through column bitline 312 at time T4.

Once the first ADC conversion 432 of the input voltage $V_{IN}$ 430 is complete, the transfer transistor control signal TX8 416A is asserted or pulsed at time T5 while the reset transistor control signal 420 and the transfer transistor control signals TX0-TX7 416B remain in the off state. Thus, the PDAF transfer transistor 316-8 is turned on at time T5 while the transfer transistors 316-0 through 316-7 remain turned off at time T5. As such, the charge that is photogenerated in PDAF photodiode PD8 304-8 is transferred to the shared floating diffusion 318 at time T5.

As the charge is transferred to shared floating diffusion 318 at time T5 from the PDAF photodiode PD8 304-8, the bitline voltage begins to fall, which is reflected in the input voltage $V_{IN}$ 430 falling accordingly at time T5 at shown. After the charge has been transferred from PDAF photodiode PD8 304-8 to the shared floating diffusion 318, the transfer transistor control signal TX8 416A is de-asserted, which turns off the transfer transistor 316-8. After the input voltage $V_{IN}$ 430 has settled, a second ADC conversion operation 432 is performed by ADC 332 at time T6 to output a second ADC conversion of the input voltage $V_{IN}$ 430, which is representative of a PDAF readout from pixel circuit 314 at time T6.

Once the second ADC conversion 432 of the input voltage $V_{IN}$ 430 is complete, the transfer transistor control signals TX0-TX7 416B are asserted or pulsed at time T7 while the reset transistor control signal 420 and the transfer transistor control signal TX8 416A remain in the off state. Thus, the transfer transistors 316-0 to 316-7 are turned on at time T7 while the transfer transistor 316-8 remains turned off at time T7. As such, the charge that is photogenerated in image sensing photodiodes PD0 304-0 to PD7 304-7 is transferred to or combined with the charge in the shared floating diffusion 318 at time T7. It is noted that the charge in shared floating diffusion 318 is not reset a second time prior to the transfer of the charge from image sensing photodiodes PD0 304-0 to PD7 304-7 in accordance with the teachings of the present invention.

With the additional charge transferred to shared floating diffusion 318 at time T7 from the image sensing photodiodes PD0 304-0 to PD7 304-7, the bitline voltage begins to fall again, which is reflected in the input voltage $V_{IN}$ 430 falling accordingly at time T7 at shown. After the additional charge has been transferred from image sensing photodiodes PD0 304-0 to PD7 304-7 to the shared floating diffusion 318, the transfer transistor control signals TX0-TX7 416B are de-asserted, which turn off the transfer transistors 316-0 and 316-7. After the input voltage $V_{IN}$ 430 has settled again, a third ADC conversion operation 432 is performed by ADC 332 at time T8 to output a third ADC conversion of the input voltage $V_{IN}$ 430, which is used to determine a combined readout of pixel circuit 314 at time T8. In one example, an image readout can be determined in response to he combined readout.

Once the third ADC conversion 432 of the input voltage $V_{IN}$ 430 is complete, the row select transistor control signal 426 is then de-asserted at time T9, which turns off the row select transistor 326, causing the input voltage $V_{IN}$ 430 to return to its idle state value.

In summary, it is appreciated that three ADC conversions 432 are utilized to perform the PDAF readout and the image readout with correlated double sampling (CDS) in accordance with the teachings of the present invention. The first ADC conversion (e.g., $D_{OUT1}$) is used to obtain the reference readout at time T4, the second ADC conversion (e.g., Dom) is used to obtain the PDAF readout at time T6, and the third ADC conversion (e.g., $D_{OUT3}$) is used to obtain a full combined readout from which the image readout can be determined at time T8.

In the signal processing, the CDS PDAF reading can be determined by finding the difference between the second ADC conversion (e.g., $D_{OUT2}$) and the first ADC conversion (e.g., $D_{OUT1}$) or $D_{OUT2}-D_{OUT1}$. The image readout can be determined by finding the difference between the third ADC conversion (e.g., $D_{OUT3}$) and the second ADC conversion (e.g., $D_{OUT2}$) or $D_{OUT3}-D_{OUT2}$.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification.

Rather, the scope of the invention is to be determined entirely by the following claims, which are to be construed in accordance with established doctrines of claim interpretation.

What is claimed is:

1. An imaging device, comprising:
   a plurality of photodiodes arranged in a photodiode array to generate charge in response to incident light, wherein the photodiode array includes a 2×2 grouping of N×N groupings of photodiodes, wherein N is greater than 1, wherein each N×N grouping of photodiodes includes $N^2-1$ image sensing photodiodes and a single phase detection autofocus (PDAF) photodiode that is arranged proximate to a center region of the 2×2 grouping of N×N groupings of photodiodes;
   a shared floating diffusion configured to receive charge transferred from each photodiode of a respective N×N grouping of photodiodes; and
   an analog to digital converter (ADC) configured to perform a first ADC conversion to generate a reference readout in response to charge in the shared floating diffusion after a reset operation, wherein the ADC is next configured to perform a second ADC conversion to generate a PDAF readout in response to charge transferred from the single PDAF photodiode to the shared floating diffusion, wherein the ADC is then configured to perform a third ADC conversion to generate a combined readout in response to charge transferred from the $N^2-1$ image sensing photodiodes combined with the charge transferred previously from the single PDAF photodiode in the shared floating diffusion.

2. The imaging device of claim 1, further comprising:
   a plurality of transfer transistors, wherein each one of the plurality of transfer transistors is coupled between the shared floating diffusion and a respective photodiode of the respective N×N grouping of photodiodes, wherein the plurality of transfer transistors includes a PDAF transfer transistor coupled between the shared floating diffusion and the single PDAF photodiode of the respective N×N grouping of photodiodes, wherein the plurality of transfer transistors further includes $N^2-1$ image sensing transfer transistors coupled between the shared floating diffusion and the $N^2-1$ image sensing photodiodes of the respective N×N grouping of photodiodes;
   a reset transistor coupled between the shared floating diffusion and a voltage supply;
   a source follower transistor having a gate coupled to the shared floating diffusion and a source coupled to a column bitline, wherein the ADC is coupled to the column bitline.

3. The imaging device of claim 2, further comprising a row select transistor coupled to the source follower transistor, wherein the source follower transistor and the row select transistor are coupled between the voltage supply and the column bitline.

4. The imaging device of claim 2, wherein the reset operation includes the reset transistor being pulsed while the plurality of transfer transistors are turned off to reset the charge in the shared floating diffusion.

5. The imaging device of claim 2, wherein the PDAF readout is generated in response to the single PDAF transfer transistor being pulsed while the reset transistor and the $N^2-1$ image sensing transfer transistors are turned off.

6. The imaging device of claim 1, wherein the PDAF readout is determined in response to a difference between the second ADC conversion and the first ADC conversion.

7. The imaging device of claim 2, wherein the combined readout is generated in response to the $N^2-1$ image sensing transfer transistors being pulsed while the reset transistor and the single PDAF transfer transistor are turned off.

8. The imaging device of claim 1, wherein an image readout is determined in response to a difference between the third ADC conversion and the second ADC conversion.

9. The imaging device of claim 1, wherein the PDAF readout of each N×N grouping is configured to be evaluated relative to a PDAF readout of a neighboring N×N grouping to determine focus information of the image readout.

10. The imaging device of claim 9, wherein said each N×N grouping and said neighboring N×N grouping are horizontally adjacent N×N groupings in the photodiode array.

11. The imaging device of claim 9, wherein said each N×N grouping and said neighboring N×N grouping are vertically adjacent N×N groupings in the photodiode array.

12. The imaging device of claim 1, further comprising a color filter array disposed over the photodiode array.

13. The imaging device of claim 12, wherein the $N^2-1$ image sensing photodiodes of each N×N grouping are all configured to be illuminated through a respective one of the color filters of the color filter array.

14. The imaging device of claim 13, wherein the $N^2-1$ image sensing photodiodes of a neighboring N×N grouping of said each N×N grouping are all configured to be illuminated through a different one of the color filters of the color filter array having a different color.

15. The imaging device of claim 14, wherein the single PDAF photodiodes of each N×N grouping proximate to the center region of the 2×2 grouping of N×N groupings are all configured to be illuminated with monochromatic light.

16. An imaging system, comprising:
   a plurality of photodiodes arranged in a photodiode array to generate charge in response to incident light, wherein the photodiode array includes a 2×2 grouping of N×N groupings of photodiodes, wherein N is greater than 1, wherein each N×N grouping of photodiodes includes $N^2-1$ image sensing photodiodes and a single phase detection autofocus (PDAF) photodiode that is arranged proximate to a center region of the 2×2 grouping of N×N groupings of photodiodes;
   a shared floating diffusion configured to receive charge transferred from each photodiode of a respective N×N grouping of photodiodes;
   a control circuit coupled to the photodiode array to control operation of the photodiode array; and
   a readout circuit coupled to the photodiode array to read out signals from the photodiode array through the plurality of column bitlines,
   wherein the readout circuit includes an analog to digital converter (ADC) configured to perform a first ADC conversion to generate a reference readout in response to charge in the shared floating diffusion after a reset operation,
   wherein the ADC is next configured to perform a second ADC conversion to generate a PDAF readout in response to charge transferred from the single PDAF photodiode to the shared floating diffusion,
   wherein the ADC is then configured to perform a third ADC conversion to generate a combined readout in response to charge transferred from the $N^2-1$ image sensing photodiodes combined with the charge transferred previously from the single PDAF photodiode in the shared floating diffusion.

17. The imaging system of claim 16, further comprising:
a plurality of transfer transistors, wherein each one of the plurality of transfer transistors is coupled between the shared floating diffusion and a respective photodiode of the respective N×N grouping of photodiodes, wherein the plurality of transfer transistors includes a PDAF transfer transistor coupled between the shared floating diffusion and the single PDAF photodiode of the respective N×N grouping of photodiodes, wherein the plurality of transfer transistors further includes $N^2-1$ image sensing transfer transistors coupled between the shared floating diffusion and the $N^2-1$ image sensing photodiodes of the respective N×N grouping of photodiodes;
a reset transistor coupled between the shared floating diffusion and a voltage supply;
a source follower transistor having a gate coupled to the shared floating diffusion and a source coupled to a column bitline, wherein the ADC is coupled to one of the plurality of column bitlines.

18. The imaging system of claim 17, further comprising a row select transistor coupled to the source follower transistor, wherein the source follower transistor and the row select transistor are coupled between the voltage supply and said one of the plurality of column bitlines.

19. The imaging system of claim 17, wherein the reset operation includes the reset transistor being pulsed while the plurality of transfer transistors are turned off to reset the charge in the shared floating diffusion.

20. The imaging system of claim 17, wherein the PDAF readout is generated in response to the single PDAF transfer transistor being pulsed while the reset transistor and the $N^2-1$ image sensing transfer transistors are turned off.

21. The imaging system of claim 16, wherein the PDAF readout is determined in response to a difference between the second ADC conversion and the first ADC conversion.

22. The imaging system of claim 17, wherein the combined readout is generated in response to the $N^2-1$ image sensing transfer transistors being pulsed while the reset transistor and the single PDAF transfer transistor are turned off.

23. The imaging system of claim 16, wherein an image readout is determined in response to a difference between the third ADC conversion and the second ADC conversion.

24. The imaging system of claim 16, wherein the PDAF readout of each N×N grouping is configured to be evaluated relative to a PDAF readout of a neighboring N×N grouping to determine focus information of the image readout.

25. The imaging system of claim 24, wherein said each N×N grouping and said neighboring N×N grouping are horizontally adjacent N×N groupings in the photodiode array.

26. The imaging system of claim 24, wherein said each N×N grouping and said neighboring N×N grouping are vertically adjacent N×N groupings in the photodiode array.

27. The imaging system of claim 16, further comprising a color filter array disposed over the photodiode array.

28. The imaging system of claim 27, wherein the $N^2-1$ image sensing photodiodes of each N×N grouping are all configured to be illuminated through a respective one of the color filters of the color filter array.

29. The imaging system of claim 28, wherein the $N^2-1$ image sensing photodiodes of a neighboring N×N grouping of each N×N grouping are all configured to be illuminated through a different one of the color filters of the color filter array having a different color.

30. The imaging system of claim 20, wherein the single PDAF photodiodes of each N×N grouping proximate to the center region of the 2×2 grouping of N×N groupings are all configured to be illuminated with monochromatic light.

* * * * *